US011135492B2

(12) United States Patent
Guan et al.

(10) Patent No.: US 11,135,492 B2
(45) Date of Patent: Oct. 5, 2021

(54) METHOD, TERMINAL AND RUNNING SHOE FOR PROMPTING A USER TO ADJUST A RUNNING POSTURE

(71) Applicant: BOE TECHNOLOGY GROUP CO., LTD., Beijing (CN)

(72) Inventors: Enhui Guan, Beijing (CN); Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 224 days.

(21) Appl. No.: 15/742,479

(22) PCT Filed: Jun. 9, 2017

(86) PCT No.: PCT/CN2017/087720
§ 371 (c)(1),
(2) Date: Jan. 5, 2018

(87) PCT Pub. No.: WO2018/001070
PCT Pub. Date: Jan. 4, 2018

(65) Prior Publication Data
US 2018/0200598 A1 Jul. 19, 2018

(30) Foreign Application Priority Data
Jun. 30, 2016 (CN) .......................... 201610513958.X

(51) Int. Cl.
A63B 69/00 (2006.01)
A43B 5/06 (2006.01)
(Continued)

(52) U.S. Cl.
CPC ............ A63B 69/0028 (2013.01); A43B 3/00 (2013.01); A43B 5/06 (2013.01); A63B 24/0062 (2013.01);
(Continued)

(58) Field of Classification Search
CPC ............ A63B 69/0028; A63B 24/0062; A63B 2024/0065–0071; A63B 2220/56; A63B 2220/836; A63B 2225/50; A43B 3/0005
See application file for complete search history.

(56) References Cited

U.S. PATENT DOCUMENTS 10,307,081 B2 *   6/2019   Nino .................... A61B 5/6807
2003/0163287 A1 *  8/2003   Vock .................... A61B 5/1118
                                                            702/187
(Continued)

FOREIGN PATENT DOCUMENTS

CN    204709102 U    10/2015
CN    105549730 A     5/2016
(Continued)

OTHER PUBLICATIONS

Daoud et al. ("Foot Strike and Injury Rates in Endurance Runners: A Retrospective Study" Med. Sci. Sports Exerc., vol. 44, No. 7, pp. 1325-1334, 2012.) (Year: 2012).*
(Continued)

Primary Examiner — Nathaniel J Kolb
(74) Attorney, Agent, or Firm — Womble Bond Dickinson (US) LLP

(57) ABSTRACT

This disclosure provides a method, a terminal and a running shoe for prompting a user to adjust a running posture. The method comprises: obtaining running posture information of the user in real time; determining a current running status of the user based on the running posture information; and generating a feedback for prompting the user to adjust the running posture based on the current running status of the user. By using the technical solutions of this disclosure, the user can know his/her own running posture and running status intuitively in real time when running, so as to adjust his/her own running posture timely. This not only increases
(Continued)

operation convenience of the user but also reduces hurt to knees or feet of the user.

13 Claims, 5 Drawing Sheets

(51) Int. Cl.

| | | |
|---|---|---|
| *A43B 3/00* | (2006.01) | |
| *G06F 3/16* | (2006.01) | |
| *A63B 24/00* | (2006.01) | |
| *G09B 5/06* | (2006.01) | |
| *G09B 19/00* | (2006.01) | |
| *H04M 1/72409* | (2021.01) | |
| *A63B 71/06* | (2006.01) | |
| *G06F 3/01* | (2006.01) | |
| *H04B 1/3827* | (2015.01) | |

(52) U.S. Cl.
CPC .............. *G06F 3/167* (2013.01); *G09B 5/06* (2013.01); *G09B 19/0038* (2013.01); *A43B 3/0005* (2013.01); *A63B 71/06* (2013.01); *A63B 2220/56* (2013.01); *A63B 2220/836* (2013.01); *A63B 2225/50* (2013.01); *G06F 3/016* (2013.01); *G06F 3/165* (2013.01); *H04B 1/3827* (2013.01); *H04M 1/72409* (2021.01)

(56) References Cited

U.S. PATENT DOCUMENTS

| | | | | |
|---|---|---|---|---|
| 2006/0143645 | A1* | 6/2006 | Vock | G01B 7/004 |
| | | | | 725/9 |
| 2007/0118043 | A1* | 5/2007 | Oliver | A63B 24/0062 |
| | | | | 600/519 |
| 2011/0054359 | A1* | 3/2011 | Sazonov | A61B 5/4866 |
| | | | | 600/595 |
| 2015/0125839 | A1* | 5/2015 | Tillges | A61B 5/1038 |
| | | | | 434/262 |
| 2017/0027512 | A1* | 2/2017 | Yuan | G01S 19/13 |
| 2018/0028862 | A1* | 2/2018 | Statham | A63B 24/0062 |
| 2018/0325453 | A1* | 11/2018 | Yang | A43B 7/00 |
| 2019/0269352 | A1* | 9/2019 | Brown | A61B 5/1038 |

FOREIGN PATENT DOCUMENTS

| | | |
|---|---|---|
| CN | 105635938 A | 6/2016 |
| CN | 105661742 A | 6/2016 |
| CN | 105852319 A | 8/2016 |
| CN | 105944331 A | 9/2016 |
| CN | 106027796 A | 10/2016 |
| WO | 2014/081154 A1 | 5/2014 |

OTHER PUBLICATIONS

International Search Report received for PCT Patent Application No. PCT/CN2017/087720, dated Aug. 30, 2017, 8 pages (3 pages of English Translation and 5 pages of Original Document).

* cited by examiner

METHOD, TERMINAL AND RUNNING SHOE FOR PROMPTING A USER TO ADJUST A RUNNING POSTURE

RELATED APPLICATIONS

The present application is the U.S. national phase entry of PCT/CN2017/087720, with an international filing date of Jun. 9, 2017, which claims the benefit of Chinese Patent Application No. 201610513958.X, filed on Jun. 30, 2016, the entire disclosures of which are incorporated herein by reference.

TECHNICAL FIELD

This disclosure relates to the technical field of wearable devices, particularly to a method, a terminal and a running shoe for prompting a user to adjust a running posture.

BACKGROUND

In recent years, people have obviously paid more attention to their own health conditions. More and more people have participated in morning jogging every day. However, an improper running posture could not enable good physical exercise. On the contrary, it may result in hurt to knees or ankles. For instance, the feet or the knees may be hurt if the running speed is too high.

At present, the running posture is mainly detected by detecting images after running is finished. This manner lacks of timeliness.

SUMMARY

This disclosure provides technical solutions for solving at least one of the above technical problems.

According to an aspect of this disclosure, there is provided a method for prompting a user to adjust a running posture, comprising:

obtaining running posture information of the user in real time;

determining a current running status of the user based on the running posture information; and generating a feedback for prompting the user to adjust the running posture based on the current running status of the user.

According to another aspect of this disclosure, there is provided a terminal for prompting a user to adjust a running posture, comprising:

an obtaining module for obtaining running posture information of the user in real time;

a processing module for determining a current running status of the user based on the running posture information; and a feedback module for generating a feedback for prompting the user to adjust the running posture based on the current running status of the user.

According to a further aspect of this disclosure, there is provided a running shoe for prompting a user to adjust a running posture, comprising:

a running shoe body;

a detection apparatus arranged in the running shoe body for obtaining running posture information of the user; and a transmission apparatus for transmitting the running posture information to a terminal, so as to enable the terminal to determine a current running status of the user based on the running posture information and then generate a feedback for prompting the user to adjust the running posture.

BRIEF DESCRIPTION OF THE DRAWINGS

The drawings are used for providing further understanding to this disclosure and constitute a part of the Specification. They are used for explaining this disclosure along with embodiments of this disclosure and do not constitute limitation to this disclosure. In the drawings.

DETAILED DESCRIPTION OF THE EMBODIMENTS

Embodiments of this disclosure will be explained below in conjunction with the drawings. It is to be understood that the embodiments described herein are only used for illustrating and explaining this disclosure rather than limiting this disclosure.

By using a method, a terminal and a running shoe for prompting a user to adjust a running posture according to this disclosure, the user can know his/her own running posture and running status directly in real time when running, so as to adjust his/her own running posture timely. This not only improves operation convenience of the user, but also reduces hurt to knees or feet of the user.

Figure 1:
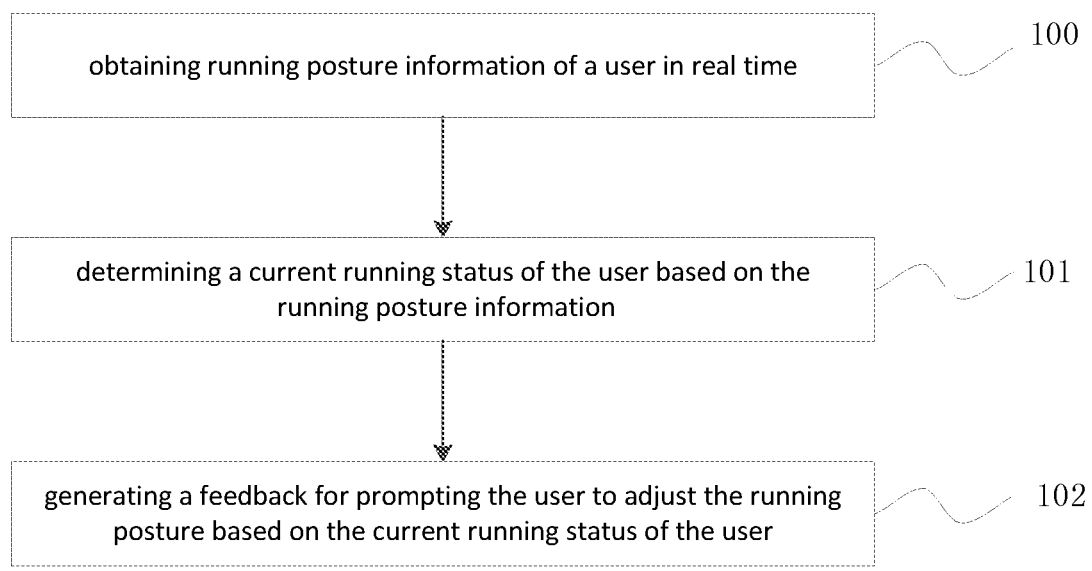
FIG. 1 is a flow chart of a general method for prompting a user to adjust a running posture provided by an embodiment of this disclosure.

FIG. 1 is a schematic flow chart of a general method for prompting a user to adjust a running posture provided by an embodiment of this disclosure. The following steps are comprised as shown in FIG. 1.

At 100, running posture information of a user is obtained in real time.

Particularly, this step can be performed by a mobile terminal with data processing and media playing functions such as a mobile phone, a tablet, a smart mobile phone, a smart watch, smart glasses and so on. The mobile terminal is generally worn or hand-held by a user. The mobile terminal can obtain the running posture information of the user from the wearable device (such as a heart rate detector, a smart vervel etc.) of the user in a wireless or wired manner.

In addition, this step can also be performed by a non-mobile terminal or a server.

The running posture information can include information collected by various sensors and information computed therefrom, such as a running frequency (i.e., a moving frequency of feet in running), pressure of feet to the shoe in running, a heart rate in running, a leg lift height in running, etc.

In an embodiment, obtaining the running gesture information of the user in real time can comprise obtaining the running posture information of the user at a predetermined time interval (e.g., 5 seconds, 10 seconds etc.). Of course, obtaining the running gesture information of the user in real time can also indicate obtaining the running posture information of the user aperiodically.

According to this disclosure, by obtaining the running posture information of the user in real time, the user can know his/her own current running posture timely, so as to adjust the running posture timely, thereby reducing hurt to the soles and knees.

At 101, a current running status of the user is determined based on the running posture information.

After the running posture information of the user is obtained by the mobile terminal, the current running status of the user can be determined based on the running posture information. In an embodiment, the current running status of the user can be determined by comparing the running posture information with a predetermined reference value. In this case, the current running status of the user can be generally determined as two statuses. One is harmful to the user (e.g., soles and knees), i.e., the running posture is improper. The other one is harmless to the user, i.e., the running posture is proper. Of course, the current running status of the user can be further subdivided by the skilled person in the art, as needed.

At 102, a feedback for prompting the user to adjust the running posture is generated based on the current running status of the user.

After the current running status of the user is determined, a haptic feedback, an auditory feedback or a visual feedback corresponding to the determined running status can be generated, so as to prompt the user his/her current running status. In an embodiment, these feedbacks can be generated separately. In another embodiment, these feedbacks can be generated in combination.

According to this disclosure, the generated haptic feedback can include for example mechanical vibration. A speed of the mechanical vibration can for example correspond to a speed of user running. Also, the auditory feedback can include speech, music, volume change etc. The volume of the speech or the music can correspond to the speed of user running. Further, the visual feedback can include text displayed on the screen, or flashing light etc. The text indicates the current running status of the user clearly, and intensity of the flashing light can correspond to the speed of user running.

Based on the above description, the skilled person in the art can easily think of other feedback forms. All of these feedback forms can fall within the protection scope of the present invention.

In an embodiment, only if the current running status of the user is harmful to the user, the above-mentioned haptic feedback, auditory feedback or visual feedback is generated, so as to prompt the user a need to adjust the running posture. No feedback may be generated when the current running status of the user is harmless to the user.

In another embodiment, no matter how the current running status of the user is, a feedback matching with it is generated.

By means of the technical solutions of the embodiments of this disclosure, the user can know directly in real time whether his/her own current running posture is proper, so as to adjust his/her own current running posture, thereby avoiding hurt to the knees and soles effectively.

Figure 2:
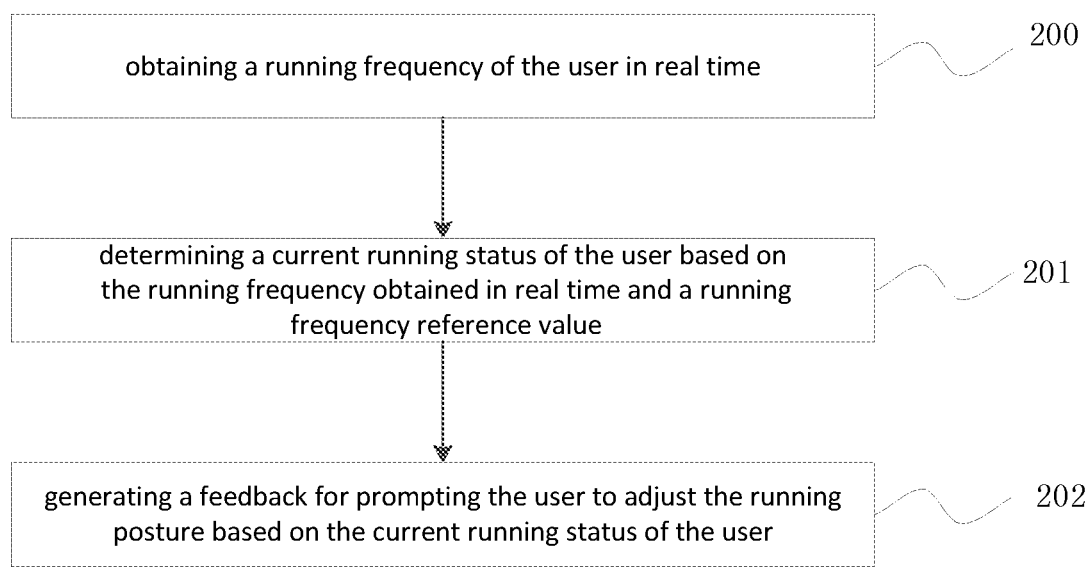
FIG. 2 is a schematic flow chart of a method for prompting a user to adjust a running posture provided by an embodiment of this disclosure.

FIG. 2 is a flow chart of a method for prompting a user to adjust a running posture based on a running frequency provided by an embodiment of this disclosure. As shown in FIG. 2, the method can comprise the following steps.

At 200, a running frequency of the user is obtained in real time.

The running frequency of the user can be obtained in various ways. In an embodiment, the running frequency of the user when running can be obtained directly through a smart vervel and the like worn by the user when running. In another embodiment, the running frequency of the user can be obtained indirectly by obtaining a swing frequency of user arms collected by a smart bracelet or smart watch worn by the user when running, because the swing frequency of the arms is the same as the running frequency of the feet.

In an embodiment, the running frequency can be collected through a vibration sensor arranged in the wearable device. The vibration sensor is one of the key components in the test technology. Its function lies mainly in receiving mechanical quantity and converting it into electrical quantity in proportion therewith. The vibration sensor does not convert initially-measured mechanical quantity into electrical quantity. Instead, it takes the initially-measured mechanical quantity as input quantity of the vibration sensor, which is then received by a mechanical receiving part, and forms another mechanical quantity suitable for conversion. It is finally converted into electrical quantity by an electromechanical conversion part. For example, operating principle of a relative vibration meter is that in measurement, the meter is fixed on an immovable bracket, so as to enable a vibration direction of a feeler lever to be consistent with that of a measured object, and in contact with the surface of the measured object by means of elastic force of a spring. When the object vibrates, the feeler lever will move with it and push a recording pen to draw on a moving paper tape a curve of displacement of the vibrating object over time. Parameters such as size and frequency of the displacement can be calculated based on this recording curve. When an inertial mechanical vibration meter measures vibration, the vibration meter is fixed directly on a measure point of the measured vibrating object. When a housing of the sensor moves with the measured vibrating object, an inertial mass block supported by elasticity will move relative to the housing. In this way, the recording pen mounted on the mass block is able to record amplitude of displacement of vibration of the mass block relative to the housing. Then a waveform of an absolute vibration displacement of the measured object can be derived using a relational expression of the displacement of vibration of the inertial mass block relative to the housing.

In another embodiment, the running frequency can also be calculated by a step counting apparatus assembled in the wearable device. For example, data may be collected by a 3-axis acceleration sensor firstly. Then filtering and secondary peak detection are performed to it. The number of the detected peaks is exactly the number of the steps. The running frequency can be determined based on the number of the steps and time. Of course, the running frequency can also be detected by other conventional frequency detection apparatuses, which will not be repeated here.

In an embodiment, the wearable device can be provided with a transmission module for, after the wearable device collects the running frequency of the user, transmitting data such as the running frequency to e.g. a mobile terminal in e.g. a wireless transmission mode for further processing. The wireless transmission mode for example includes short range transmission modes such as Bluetooth, Zigbee, or transmission modes such as 3G, 4G, WIFI etc. (if a network service is covered). Accordingly, the mobile terminal has a receiving module for receiving data such as a running frequency.

At 201, the current running status of the user is determined based on the running frequency obtained in real time and a running frequency reference value.

After the mobile terminal obtains the running posture information of the user in real time, the current running status of the user can be determined based on the running posture information.

For example, after the mobile terminal obtains the running frequency of the user, a current swing frequency of both feet can be determined. If the swing frequency of both feet is too high, it is likely to hurt the knees. Based on this recognition, a suitable running frequency reference value can be preset for the user and the current running status of the user can be determined by comparing the preset running frequency reference value with the running frequency obtained in real time. If the current running frequency of the user is less than or equal to the running frequency reference value, it can be determined that the current running status of the user is harmless to the user, i.e., the knees would not be hurt. If the current running frequency of the user is greater than the running frequency reference value, it can be determined that the current running status of the user is harmful to the user, i.e., it is likely to hurt the knees.

According to this disclosure, the running frequency reference value can be set based on user's age, weight, height, gender and so on.

At 202, a feedback for prompting the user to adjust the running posture is generated based on the current running status of the user.

If the determined current running status of the user is harmful to the user, i.e., the obtained running frequency is greater than the running frequency reference value, then a haptic feedback, an auditory feedback or a visual feedback can be generated so as to prompt the user that current running is too fast, which may hurt knees easily. Based on this prompt, the user can adjust a running speed timely.

If the determined current running status of the user is harmless to the user, i.e., the obtained running frequency is less than or equal to the running frequency reference value, then no feedback may be generated, or a feedback for indicating that the current running posture is good may be generated. The feedbacks in various forms has been explained above, which will not be repeated here.

By means of the technical solution of this embodiment, the user can know his/her own running status directly in real time when running, and thus adjust his/her own current running posture timely, so as to avoid hurt to the knees effectively.

The preceding embodiments obtain the running posture information of the user by means of a smart wearable device worn on the body of the user. However, if the user wears too many smart wearable devices when running, discomfort may occur when running. Based on this, in an embodiment according to this disclosure, an apparatus for collecting the running posture information of the user is arranged in a running shoe worn by the user when running. In such a case, the running posture information of the user is obtained from the running shoe.

Figure 6:
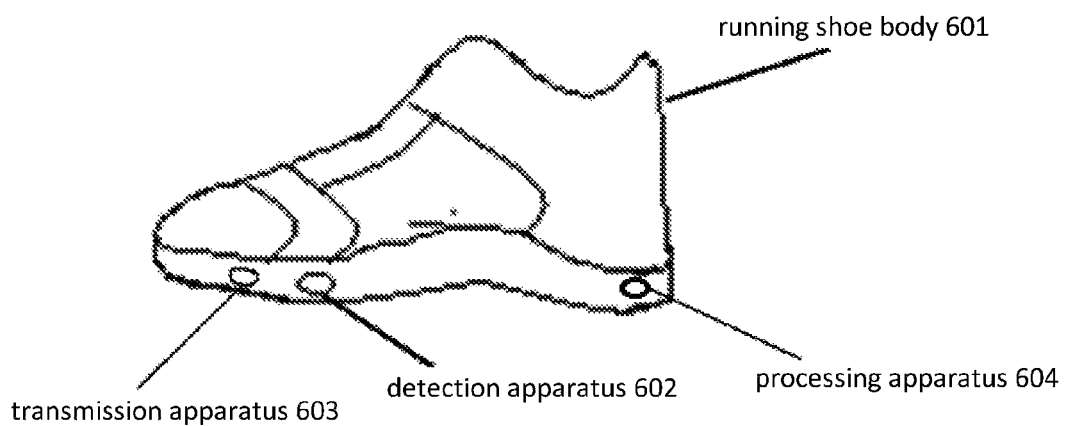
FIG. 6 is a schematic structural diagram of a running shoe provided by an embodiment of this disclosure.

Based on this, the running shoe must at least comprise a detection apparatus 602 arranged in the running shoe for obtaining the running posture information of the user, as will be later described in detail in FIG. 6. Optionally, as shown in FIG. 6, the running shoe also comprises a transmission apparatus 603 for providing the running posture information to the mobile terminal, so that the mobile terminal can determine the current running status of the user based on the running posture information. Particularly, the transmission apparatus converts the running posture information into a communication signal which is transmitted to the mobile terminal in e.g. short range transmission mode, such as Bluetooth, Zigbee and so on, or in transmission modes such as 3G, 4G, WIFI, and so on if a network service is covered.

It is further considered that knees or angles are hurt mainly due to stress to the feet when the user is running. Compared to the running frequency, stress to the soles in running can better reflect possibility of hurt of the knees and ankles. Hence, in order to determine more accurately whether the running posture of the user may hurt the knees, for example, instead of detection to the running frequency, a pressure sensor (i.e., a part of the detection and transmission module) can be arranged between the shoe-sole and the shoe-pad in the running shoe of the user to detect real time pressure values of the sole to the running shoe so as to determine the running status of the user.

To this end, the detection apparatus 62 in the running shoe can be a pressure sensor. As shown in FIG. 6, a pressure sensor can be arranged at a shoe-pad corresponding to a part that applies a force to the ground when a forefoot of the user is running. In addition, the pressure sensor can also be located at the heel of the user. The skilled person in the art can easily think of arranging the pressure sensor at any suitable position of the running shoe.

In another embodiment, a plurality of pressure sensors can be arranged at different positions of the running shoe, so as to improve the accuracy of determining whether the running posture of the user is proper.

Considering that the pressure sensor arranged in the running shoe needs to have a light-weight and miniaturized characteristic, the pressure sensor according to an embodiment of this disclosure for example can be a semiconductor piezoresistance pressure sensor, which enables a thin sheet to be deformed through an external force (pressure), so as to produce a piezoresistive effect, thereby enabling impedance variation to be converted into an electric signal. The pressure sensor according to an embodiment of this disclosure can also be an electrostatic capacity pressure sensor, which disposes a fixed pole of glass to be opposite to a movable pole of silicon so as to form a capacitance, and enable, through an external force (pressure), the variation of the electrostatic capacity generated by deformation of the movable pole to be converted into an electrical signal.

Figure 3:
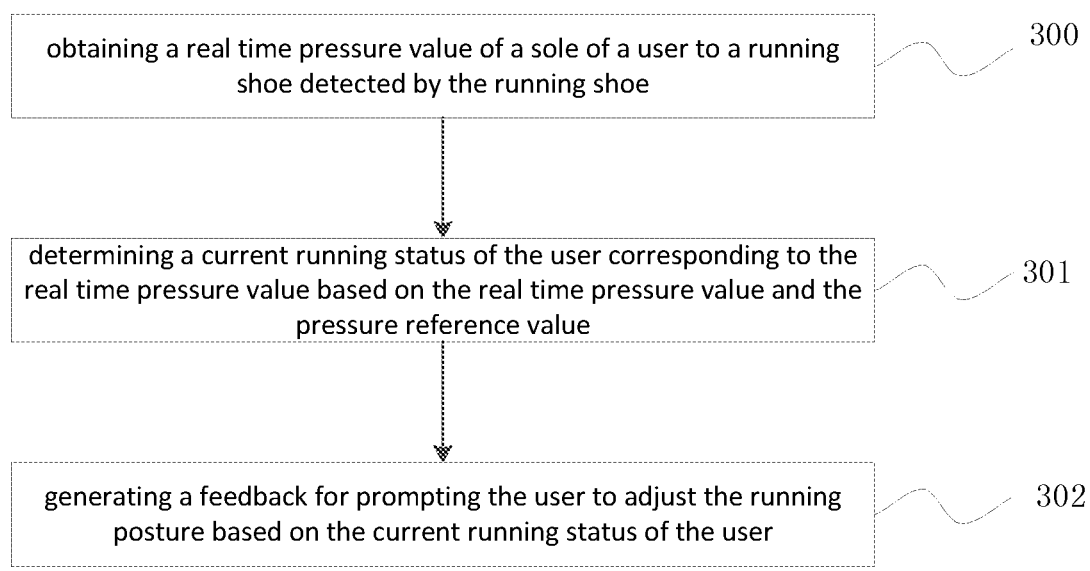
FIG. 3 is a schematic flow chart of a method for prompting a user to adjust a running posture provided by an embodiment of this disclosure.

FIG. 3 is a flow diagram of a method for prompting a user to adjust a running posture based on a sole pressure value provided by an embodiment of this disclosure. As shown in FIG. 3, the method for prompting the user to adjust the running posture provided by this embodiment can comprise the following steps.

At 300, a real time pressure value of the user sole to the running shoe detected by the running shoe is obtained.

The obtaining can be performed with a certain sampling cycle. For example, the pressure value of the user sole to the running shoe is detected every 5 seconds. In order to exclude errors brought by the user stepping on uneven ground occasionally, a mean value can be taken from the pressure values detected successive N times. For example, the mean value of the pressure values detected successive 5 times is taken as the real time pressure value.

In an embodiment, the real time pressure value is a pressure value at a particular position of a foot.

In another embodiment, considering that the feet apply forces to a plurality parts of the running shoes worn thereon when the user is running, in order to obtain the running posture information more accurately, a plurality of pressure values of a plurality of parts provided by the running shoe at a certain moment can be obtained as the real time pressure values. For example, a plurality of pressure sensors are respectively arranged at the front sole, the heel, the side etc. of the running shoe worn by the user, so as to obtain a plurality of pressure values from these pressure sensors as the real time pressure values. These real time pressure values can be later used for comparing with their corresponding pressure reference values respectively to determine the running status of the user.

At 301, the current running status of the user corresponding to the real time pressure value is determined based on the real time pressure value and the pressure reference value.

The pressure reference value generally refers to a pressure value of a corresponding sole to the running shoe when the user's running posture is proper. The pressure reference value can be preset at a mobile terminal of the user locally, and can also be obtained from a server. The server can collect running pressure values of a plurality of users to calculate the pressure reference value and transmit it to the mobile terminal.

Particularly, a relatively suitable pressure reference value can be configured for an individual with reference to age, weight, height, gender of the individual. Take weight as an example, assume that weight of a person is A kilograms (kg), a suitable pressure reference value in his running is preconfigured as B newton (N). When it is detected that the real time pressure value of the user is greater than B(N), it is determined that the current running status of the user is that the user overexerts and runs too fast.

Generally speaking, if running speed is different, a pressure value of a sole to a running shoe is different. The higher the running speed is, the larger the pressure value of the sole to the running shoe (i.e., the ground) is (correspondingly, the larger stress on the sole is). On the contrary, the lower the speed is, the smaller the pressure value is (correspondingly, the smaller the stress on the sole is). Hence, the pressure value can reflect the running speed of the user to some extent. Based on this, the user can be prompted to adjust his/her running speed by comparing the real time pressure value and the pressure reference value, so as to reduce hurt to knees or feet.

According to this disclosure, the pressure reference value can be a particular value, a value range or a plurality of particular values.

When the pressure reference value is a particular value, the current running status of the user can be determined by comparing the obtained real time pressure value with the particular value. When the real time pressure value is greater than the particular value, it is determined that the current running status of the user is that the running speed of the user is too fast, which is harmful to the body. When the real time pressure value is less than the particular value, for example, it can be determined that the current running status of the user is that the running speed of the user is lower than the suitable speed, which is harmless to the body. Of course, the current running status of the user can also be determined in other comparing ways, for example, comparing the obtained real time pressure value with the particular value. When a difference or a ratio between the real time pressure value and the particular value is greater than a preset threshold, it is determined that the current running status of the user is that the running speed of the user is too fast, or when the difference or the ratio between the real time pressure value and the particular value is less than the preset threshold, it is determined that the current running status of the user is that the running speed of the user is lower than the suitable speed.

When the pressure reference value is a value range, for example, the obtained real time pressure value can be compared with an upper limit of this value range. When the real time pressure value is greater than this upper limit, it is determined that the current running status of the user is that the running speed of the user is too fast. Of course, the obtained real time pressure value can also be compared with a lower limit of this value range. When the real time pressure value is less than this lower limit, it is determined that the running status of the user is that the running speed of the user is lower than the suitable speed.

When the pressure reference value is a plurality of particular values, a plurality of values in the obtained real time pressure values can be compared with a plurality of corresponding particular values in the pressure reference values respectively. For example, a real time pressure value obtained at the sole of the running shoe can be compared with the preset pressure reference value at the sole, and the real time pressure value obtained at the heel of the running shoe can be compared with the preset pressure reference value at the heel. When the plurality of values in the real time pressure values are all greater than the plurality of corresponding particular values in the pressure reference values, it is determined that the current running status of the user is that the running speed of the user is too fast.

At 302, a feedback for prompting the user to adjust the running posture is generated based on the current running status of the user.

According to this disclosure, the determined current running status of the user can be transmitted to the mobile terminal (e.g., a smart watch, a smart mobile phone etc.) of the user, so that the mobile terminal generates a haptic feedback, an auditory feedback or a visual feedback for prompting the user to adjust the running posture based on the current running status of the user. As stated above, common mobile terminals are for example mobile phones, tablets, smart mobile phones, smart watches, smart glasses etc. These mobile terminals have data processing and media playing functions. With portability of the mobile terminal, when running, a user typically carries devices such as a smart watch and so on. Therefore, the feedback for prompting the user can be generated by these mobile terminals. The executing subject of step 302 can be a physical apparatus of the mobile terminal itself, or a software application (App) installed on the mobile terminal.

As stated above, a haptic feedback, an auditory feedback or a visual feedback in any form can be generated, as long as it can prompt the user to adjust the running posture. Take a smart watch as an example, when the current running status of the user obtained by the smart watch is that the running speed is too fast, the smart watch generates mechanical vibration to prompt the user. Alternatively, the smart watch can play a voice with content "your current running speed is too fast which may hurt your knees", to prompt the user. Alternatively, the smart watch can also prompt, through quick light flash, the user that his/her running speed is too high, and the running posture needs to be adjusted.

Further considering that users may have a habit of listening to music in running, in order to prompt the user more intuitively whether his/her running posture is proper without influencing the user to listen to the current music, an auditory feedback can be achieved by adjusting a volume of the currently played music. In the case of taking a sole pressure value as a basis to determine whether a running posture of a user is proper, for example, when the real time pressure value is greater than the pressure reference value, a mobile terminal can increase a volume of the currently played music so as to prompt the user that a running speed thereof is too Fast. When the real time pressure value is less than the pressure reference value, the mobile terminal can reduce the volume of the currently played music so as to prompt the user that the running speed thereof is lower than a suitable speed.

For example, assume that weight of a user who carries the mobile terminal is A(kg), a pressure reference value of the user in running is preset as B Newton (N), a volume suitable for a user when a media play module in the terminal plays multimedia files such as music is preset as Q decibel (dB), it is preset to increase the play volume of the terminal when the real time pressure value is greater than the pressure reference value, and reduce the play volume of the terminal when the real time pressure value is less than the pressure reference value.

In the running process of the user:

When it is detected that a real time pressure value provided by a pressure sensor in the running shoe is F Newton (N), the terminal performs calculation to determine a value of $\Delta$, wherein $\Delta = F - B$:

When $\Delta > 0$, it is determined that the current running status of the user is that the running speed is too fast. Hence, the media play module can increase the play volume so as to prompt the user that his/her running speed is too fast. For example, the volume of the currently played music is adjusting to Q1, wherein $Q1 = Q^*(1 + \Delta/B)$.

When $\Delta < 0$, it is determined that the current running status of the user is that the running speed is lower than the suitable speed. Hence, the media play module can reduce the play volume so as to prompt the user that his/her running speed is lower than the suitable speed. For example, the volume of the currently played music is adjusted to Q2, wherein $Q2 = Q^*(1 + \Delta/B)$.

In this way, the technical solution provided by this embodiment enables the user to have a more intuitive feeling to his/her own running posture in the running process, so as to adjust his/her own running posture at any time.

Further, in order for the user to conveniently perceive the running status of the user in running, optionally, a processing apparatus 604 as shown in FIG. 6 can be arranged in the running shoe. In such a case, the determined current running status of the user can be transmitted to the processing apparatus in the running shoe. As such, a haptic feedback, an auditory feedback or a visual feedback can be generated by the processing apparatus 604 in the running shoe instead of other mobile terminals of the user.

For example, the processing apparatus 604 can be a vibration module arranged at a side edge of the running shoe. When the vibration module receives the current running status of the user, it can generate mechanical vibration so as to enable the user to perceive his/her running status. For instance, when the mobile terminal determines and returns it to the running shoe (i.e., the processing apparatus thereof), the running shoe generates successive five times mechanical vibration based on the running status so as to prompt the user that the running speed is too fast. For another example, the processing apparatus 604 can also be a voice play module arranged at a side edge of the running shoe. In such a case, when the running shoe obtains the running status that the running speed is too fast, the running shoe plays a voice with content that "your current running speed is too fast which may hurt your knees" to prompt the user. For another instance, the processing apparatus 604 can also be a light emitting module arranged at a side edge of the running shoe, when the running shoe obtains the running status that the running speed is too fast, the running shoe emits quickly flashing light to prompt the user.

According to this disclosure, knee hurt caused likely by improper application of force when the user is running is further considered. With respect to this, the disclosure provides a method for prompting a user to adjust his/her main force-application point. The method comprises: obtaining a first pressure value of a sole of a user to a running shoe and a second pressure value of a heel of the user to the running shoe at a certain moment provided by the running shoe; and determining a main force-application point of a current running posture of the user based on a difference or a proportional relationship between the first pressure value and the second pressure value, or based on a difference between a proportional relationship between the first pressure value and the second pressure value and a proportional relationship between the corresponding pressure reference values thereof, so as to determine the current running status of the user.

Figure 4:
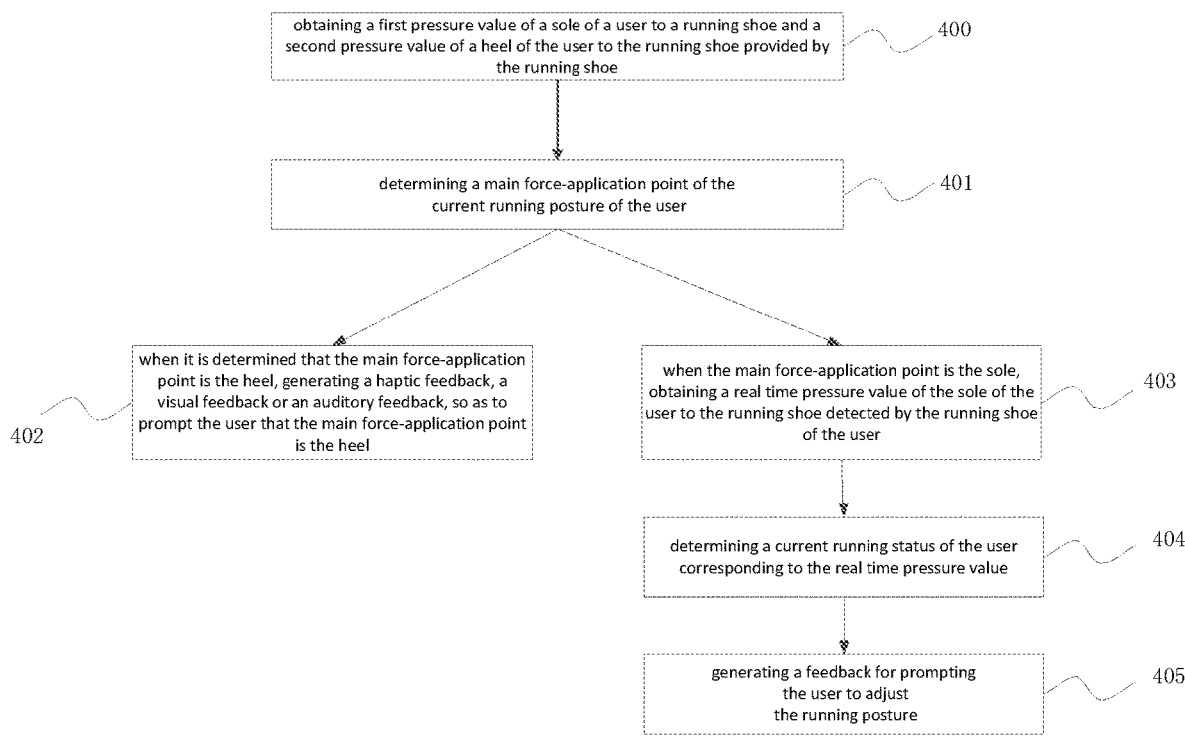
FIG. 4 is a schematic flow chart of a method for prompting a user to adjust a running posture provided by an embodiment of this disclosure.

The method will be explained below in detail in conjunction with FIG. 4. FIG. 4 is a flow chart for prompting a user to adjust a running posture provided by an embodiment of this disclosure. As shown in FIG. 4, the method can comprise the following steps.

At 400, a first pressure value of a sole of a user to a running shoe and a second pressure value of a heel of the user to the running shoe at a certain moment provided by the running shoe is obtained in real time.

For example, a first pressure sensor is arranged at a position in the running shoe corresponding to the front sole, for obtaining the first pressure value, and a second pressure sensor is arranged at a position in the running shoe corresponding to the heel, for obtaining the second pressure value.

At 401, a main force-application point of the current running posture of the user is determined based on a difference between the first pressure value and a corresponding pressure reference value thereof and a difference between the second pressure value and a corresponding pressure reference value thereof, or based on a difference between a proportional relationship between the first pressure value and the second pressure value and a proportional relationship between the corresponding pressure reference values thereof.

When the user is running, the proper running posture should be the front sole hits the ground and applies a force to the ground, while the heel only plays an auxiliary function. When the back sole of the user hits the ground and applies a force to the ground, although the user can also run, such a running posture which mainly takes the heel as the main force-application point may hurt the ankles and ligaments of feet. Hence, according to this disclosure, the main force-application point of the current running posture of the user needs to be determined.

How to determine a main force-application point of a current running posture of a user will be explained below by way of example. When pressure reference values are preset, for example, a reasonable pressure reference value X1 Newton (N) of a front sole to the ground and a reasonable pressure reference value X2(Newton) of a heel to the ground when the user is running can be preset. When a first pressure value Y1 and a second pressure value Y2 when the user is running are detected, Y1−X1 and Y2−X2 are calculated respectively. When a value of Y1−X1 is greater than or equal to 0, and a value of Y2−X2 is less than or equal to 0, it can be determined that a main force-application point of the current running posture of the user is the front sole. However, when a value of Y1−X1 is less than 0, or a value of Y2−X2 is greater than 0, it can be determined that the main force-application point of the current running posture of the user is the heel.

For another example, a reasonable pressure reference value M1 (Newton) of the front sole to the ground and a reasonable pressure reference value M2 (Newton) of the heel to the ground when the user is running can also be preset. When a first pressure value N1 and a second pressure value N2 when the user is running are detected, a value of (N1/N2) and a value of (M1/M2) are compared. When (N1/N2) is greater than (M1/M2), it can be determined that the main force-application point of the current running posture of the user is the front sole. When (N1/N2) is less than (M1/M2), it can be determined that the main force-application point of the current running posture of the user is the heel.

Of course, the skilled person in the art can easily think of other methods for determining a main force-application point based on this disclosure.

At 402, when it is determined that the main force-application point is the heel, a feedback is generated to prompt the user that the main force-application point is the heel, so as to enable the user to adjust the main force-application point. The feedback can include a haptic feedback, a visual feedback or an auditory feedback.

For example, when it is determined that the main force-application point of the current running posture of the user is a heel, a mobile terminal hold by the user plays a voice "you are running with heels". After the user heard this voice, he/she can timely adjust the main force-application point as front soles, so as to reduce hurt to knees. For another example, when it is determined that the main force-application point of the current running posture of the user is the heel, text "you are running with heels" can be displayed on a screen of the mobile terminal, or an indicator lamp emits light, to prompt the user.

At 403, when the main force-application point is a sole, a real time pressure value of the sole of the user to the running shoe detected by the running shoe is obtained.

In order to solve a problem of detection error brought by improper force-application point when the user is running (i.e., with respect to detection of a real time pressure value of a front sole of the user in running, when the user mainly uses the heel as the force-application point, the detected real time pressure value of the front sole may be less than an actual pressure value to the ground when the user mainly uses the sole as the force-application point. Relative to initially detected real time pressure values, the real time pressure values detected after the main force-application point is adjusted may be different. Hence, the real time pressure value of the sole of the user to the running shoe needs to be reobtained). After it is determined that the main force-application point of the current running posture of the user is the front sole, the real time pressure value of the sole of the user to the running shoe detected by the running shoe of the user is obtained, to facilitate comparing with the preset pressure reference value of the front sole when proper running, so as to determine whether the current running speed of the user is too fast, thereby preventing the user from being hurt.

At 404, the current running status of the user corresponding to the real time pressure value is determined based on the real time pressure value and the pressure reference value.

Performance of this step is similar to step 301 described with reference to FIG. 3, which will not be repeated here.

At 405, a feedback for prompting the user to adjust the running posture is generated based on the current running status of the user. The feedback can include a haptic feedback, an auditory feedback or a visual feedback.

Performance of this step is similar to step 302 described with reference to FIG. 3, which will not be repeated here.

By means of the technical solution provided by this embodiment, it can be determined more accurately whether the current running posture of the user is proper, thereby better preventing the user from being hurt.

Optionally, this embodiment can further comprise: storing a real time pressure value or feedback information at each moment during user running, and forming an icon based on the real time pressure value or the feedback information, exhibiting it to the user through an exhibiting module in the terminal.

It is to be explained that the technical solutions of the embodiments as shown in FIGS. 1-4 can also be combined with each other. The details may make reference to the recitation of the above embodiments, which will not be repeated here.

In addition, according to this disclosure, the running posture information of the user such as a heart rate of the user can be obtained, and compared with a reference heart rate value. When a real time heart rate is greater than the reference heart rate value, the user can be prompted that he/she runs too fast, so that the user can adjust the running posture timely. Of course, the skilled person in the art can easily think of various other variations based on this disclosure.

Figure 5:
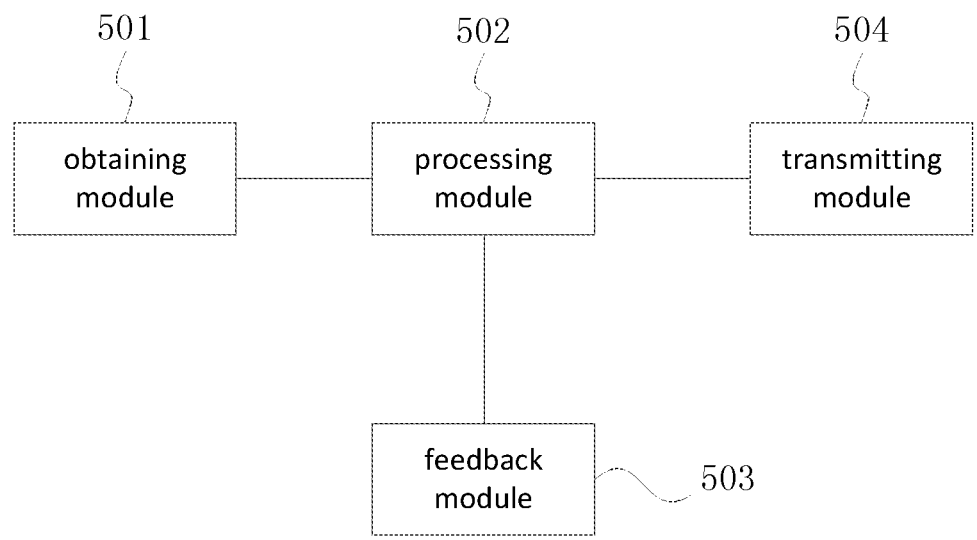
FIG. 5 is a schematic structural diagram of a terminal provided by an embodiment of this disclosure.

Based on the same inventive concept, according to this disclosure, a terminal for prompting a user to adjust a running posture is further provided. FIG. 5 is a schematic diagram of a terminal provided by an embodiment of this disclosure.

The terminal can be a mobile terminal as described above, and can also be a fixed terminal such as a desktop computer, a server and so on. When the terminal is a mobile terminal, it can obtain the running posture information of the user through short range communication such as Zigbee, Bluetooth and so on. When the terminal is a fixed terminal, it can obtain the running posture information of the user through transmission modes of 3G, 4G, WIFI etc. As shown in FIG. 5, a terminal according to an embodiment of this disclosure can include: an obtaining module 501 for obtaining running posture information of a user in real time.

Optionally, the obtaining module 501 of the terminal according to an embodiment of this disclosure can be further used for obtaining the running posture information of the user provided by the running shoe.

Optionally, the obtaining module 501 of the terminal according to an embodiment of this disclosure can further obtain a real time pressure value of a foot of the user to the running shoe detected by the running shoe of the user.

Optionally, the obtaining module 501 of the terminal according to an embodiment of this disclosure can be used for obtaining a running frequency of the user.

Optionally, the obtaining module 501 of the terminal according to an embodiment of this disclosure can be used for obtaining a plurality of pressure values of a plurality of parts at a certain moment provided by the running shoe, thereby taking the plurality of pressure values corresponding to the plurality of parts as the real time pressure values.

Optionally, the obtaining module 501 of the terminal according to an embodiment of this disclosure can be used for obtaining a first pressure value of the sole of the user to the running shoe and a second pressure value of the heel of the user to the running shoe at a certain moment provided by the running shoe.

In addition, the terminal according to an embodiment of this disclosure can further comprise:

a processing module 502 for determining a current running status of the user based on the running posture information.

Optionally, the processing module 502 of the terminal according to an embodiment of this disclosure can be further used for determining the current running status of the user corresponding to the real time pressure value based on the real time pressure value and the pressure reference value.

Optionally, the processing module 502 can be used for determining the current running status of the user by comparing a plurality of real time pressure values detected from the running shoe with a plurality of corresponding reference pressure values respectively.

Optionally, the processing module 502 can be used for determining the current running status of the user corresponding to running frequency based on the running frequency and the running frequency reference value.

Optionally, the processing module 502 can be used for determining a main force-application point of the current running posture of the user based on a difference between a first pressure value of a sole of the user to the running shoe and a corresponding pressure reference value thereof and a difference between a second pressure value of a heel of the user to the running shoe and a corresponding pressure reference value thereof, or based on a difference between a proportional relationship between the first pressure value and the second pressure value and a proportional relationship between the corresponding pressure reference values thereof, so as to facilitate the user to adjust the main force-application point.

In addition, the terminal according to an embodiment of this disclosure can further comprise:

a feedback module 503 for generating a feedback for prompting the user to adjust the running posture based on the current running status of the user. The feedback can include a haptic feedback, an auditory feedback or a visual feedback.

Optionally, the feedback module 503 can be used for increasing a volume of a music played by the terminal when the real time pressure value is greater than the pressure reference value; and reducing the volume of the music played by the terminal when the real time pressure value is less than the pressure reference value.

Optionally, the feedback module 503 can generate a haptic feedback, a visual feedback or an auditory feedback when it is determined that the main force-application point is a heel, so as to prompt the user that the main force-application point is the heel, so that the user may adjust the main force-application point.

Optionally, the terminal can further comprise a transmitting module 504 for transmitting the current running status of the user to the running shoe, so that the running shoe generates a corresponding feedback based on the current running status of the user.

Information processing implemented by the terminal of this embodiment using the above modules is the same as the embodiments as shown in FIGS. 1-4 in implementing principles and technical effects. The detailed content may make reference to the recitation of the embodiments as shown in FIGS. 1-4, which will not be repeated here.

Based on the same inventive concept, this disclosure further provides a running shoe for prompting a user to adjust a running posture. FIG. 6 is a schematic diagram of a running shoe provided by an embodiment of this disclosure. As shown in FIG. 6, the running shoe of this embodiment can comprise:

a running shoe body 601, and a detection apparatus 602 arranged in the running shoe body for obtaining the running posture information of the user in real time. In one embodiment, the detection apparatus 602 can be a pressure sensor arranged at a shoe-pad in the running shoe body corresponding to a sole.

The running shoe according to an embodiment of this disclosure can further comprise a transmission apparatus 603 for providing or transmitting the running posture information to the terminal as shown in FIG. 5, so as to enable the terminal to determine the current running status of the user based on the running posture information.

Optionally, the running shoe according to an embodiment of this disclosure further comprises:

a processing apparatus 604 for generating a feedback for prompting the user to adjust the running posture based on the current running status of the user obtained from the terminal as shown in FIG. 5. The feedback can include a haptic feedback, an auditory feedback or a visual feedback.

Further, the processing apparatus 604 can obtain the running posture information of the user directly from the detection apparatus 602 of the running shoe so as to determine the current running status of the user, and then generating a feedback for prompting the user to adjust the running posture based on the current running status of the user. The feedback can include a haptic feedback, an auditory feedback or a visual feedback.

The information processing implemented by the running shoe according to embodiments of the disclosure using the above modules is the same as the embodiments as shown in FIGS. 1-4 in implementing principles and technical effects. The details may make reference to the recitation of the embodiments as shown in FIGS. 1-4, which will not be repeated here.

Although the detection apparatus 602, the transmission apparatus 603 and the processing apparatus 604 as shown in FIG. 6 are located in different parts of the running shoe independently, the skilled person in the art can understand that they can be located in the same part of the running shoe and can be integrated together.

The skilled person in the art is to be realized that the embodiments of this disclosure can be provided as a method, a system, or a computer program product. Hence, this disclosure can take forms of complete hardware embodiments, complete software embodiments, or software and hardware combined embodiments. Moreover, this disclosure can take a form of a computer program product that is implemented on one or more computer available storage media (including but not limited to magnetic disk memory and optical memory etc.) that contain computer available program codes.

This disclosure is described with reference to the flow charts and/or block diagrams of the method, device (system), and computer program product according to the embodiments of this disclosure. It is to be understood that the computer program instruction can implement each flow and/or block in the flow chart and/or the block diagram, as well as the combination of the flows and/or blocks in the flow chart and/or the block diagram. These computer program instructions can be provided to a processor of a general computer, a dedicated computer, an embedded processor or other programmable data processing device so as to generate a machine, so that the instructions executed by the processor of the computer or other programmable data processing device generate an apparatus for implementing functions designated in one or more flows of the flow chart and/or one or more blocks of the block diagram.

These computer program instructions can also be stored in a computer readable memory that can direct computers or other programmable data processing devices to work in a particular manner, so that the instructions stored in the computer readable memory generate a manufacture product including an instruction apparatus. The instruction apparatus implements functions designated in one or more flows of the flow chart and/or one or more blocks of the block diagram.

These computer program instructions can also be installed on computers or other programmable data processing devices, so that a series of operation steps are performed on the computers or the other programmable devices so as to generate computer-implemented processing, and thus the instructions executed on the computers or other programmable devices provide steps for implementing functions designated in one or more flows of the flow chart and/or one or more blocks of the block diagram.

It is obvious that the skilled person in the art can make various modifications and variations to this disclosure without departing from the spirit and the scope of this disclosure. In this way, provided that these modifications and variations fall within the scopes of the claims of this disclosure and equivalent technologies thereof, this disclosure is also intended to encompass these modifications and variations.

The invention claimed is:

1. A method for prompting a user to adjust a running posture, comprising:
obtaining running posture information of the user provided by a running shoe in real time, comprising:
obtaining a first pressure value of a front sole of the user to the running shoe and a second pressure value of a heel of the user to the running shoe at a certain moment provided by the running shoe; and
calculating a first difference between the first pressure value and a first pressure reference value and a second difference between the second pressure value and a second pressure reference value, or calculating a first proportional relationship between the first pressure value and the second pressure value and a second proportional relationship between the first pressure reference value and the second pressure reference value, wherein the first pressure reference value is a pressure value of the front sole to the running shoe when the user's running posture is proper, the second pressure reference value is a pressure value of the heel to the running shoe when the user's running posture is proper;
determining a main force-application point of the current running posture of the user to be the front sole when the first difference is greater than or equal to 0 and the second difference is less than or equal to 0, or the first proportional relationship is greater than or equal to the second proportional relationship, and determining the main force-application point of the current running posture of the user to be the heel when the first difference is less than 0 and the second difference is greater than 0, or the first proportional relationship is less than the second proportional relationship; and
determining a current running status of the user to be harmful to the user in response to the main force-application point of the current running posture of the user being determined to be the heel, and generating a feedback for prompting the user to adjust an improper running posture in response to the current running status being determined to be harmful to the user, and
obtaining a real time pressure value of the front sole to the running shoe in response to the main force-application point of the current running posture of the user being determined to be the front sole, and generating a feedback for prompting the user to adjust a running speed in response to the obtained real time pressure value is larger than a respective pressure reference value.

2. The method as claimed in claim 1, wherein,
the obtaining the running posture information of the user provided by the running shoe comprises: obtaining a real time pressure value of the front sole of the user to the running shoe detected by the running shoe as the first pressure value and obtaining a real time pressure value of the heel of the user to the running shoe detected by the running shoe as the second pressure value.

3. The method as claimed in claim 2, wherein a haptic feedback, an auditory feedback or a visual feedback for prompting the user to adjust the improper running posture is generated by the running shoe based on the current running status of the user.

4. The method as claimed in claim 2, wherein upon determination that the main force-application point of the current running posture of the user is the front sole,
increasing a volume of currently played music when the real time pressure value of the front sole is greater than a preset pressure reference value; or,
reducing the volume of the currently played music when the real time pressure value of the front sole is less than the preset pressure reference value.

5. The method as claimed in claim 1, wherein the obtaining running posture information of the user provided by the running shoe further comprises:
obtaining a plurality of real time pressure values of a plurality of parts of the user's foot at a certain moment provided by the running shoe; and
the method further comprises:
comparing the plurality of obtained real time pressure values with respective preset pressure reference values; and
determining that the running speed of the user is too fast when the plurality of obtained real time pressure values are all greater than the respective preset pressure reference values.

6. The method as claimed in claim 1, wherein,
the obtaining the running posture information of the user in real time further comprises: obtaining a running frequency of the user in real time; and
the method further comprises: determining a current running status of the user corresponding to the running frequency based on the running frequency and a frequency reference value.

7. The method as claimed in claim 1, wherein the feedback includes a haptic feedback, an auditory feedback and a visual feedback, and wherein the haptic feedback includes mechanical vibration, the visual feedback includes text display or light flash, and the auditory feedback includes speech, music or volume change.

8. The method as claimed in claim 1, wherein obtaining the first pressure value and the second pressure value comprises:
obtaining real time front sole pressure values of the front sole of the user to the running shoe and real time heel pressure values of the heel of the user to the running shoe with a certain sampling cycle, and taking a mean value from the front sole pressure values obtained successive N times as the first pressure value and taking a mean value from the heel pressure values obtained successive N times as the second pressure value, wherein N>1.

9. A terminal for prompting a user to adjust a running posture, comprising:

an obtaining module for obtaining running posture information of the user provided by a running shoe in real time, the obtaining module configured to:

obtain a first pressure value of a front sole of the user to the running shoe and a second pressure value of a heel of the user to the running shoe at a certain moment provided by the running shoe;

calculate a first difference between the first pressure value and a first pressure reference value and a second difference between the second pressure value and a second pressure reference value, or calculate a first proportional relationship between the first pressure value and the second pressure value and a second proportional relationship between the first pressure reference value and the second pressure reference value, wherein the first pressure reference value is a pressure value of the front sole to the running shoe when the user's running posture is proper, the second pressure reference value is a pressure value of the heel to the running shoe when the user's running posture is proper; and determine a main force-application point of the current running posture of the user to be the front sole when the first difference is greater than or equal to 0 and the second difference is less than or equal to 0, or the first proportional relationship is greater than or equal to the second proportional relationship, and determining the main force-application point of the current running posture of the user to be the heel when the first difference is less than 0 and the second difference is greater than 0, or the first proportional relationship is less than the second proportional relationship;

a processing module for determining a current running status of the user based on the running posture information, comprising, determining a current running status of the user to be harmful to the user in response to the main force-application point of the current running posture of the user being determined to be the heel, and obtaining a real time pressure value of the front sole to the running shoe through the obtaining module in response to the main force-application point of the current running posture of the user being determined to be the front sole; and a feedback module for generating a feedback for prompting the user to adjust an improper running posture in response to the current running status being determined to be harmful to the user, and generating a feedback for prompting the user to adjust a running speed in response to the obtained real time pressure value of the front sole to the running shoe is larger than a respective pressure reference value.

10. The terminal as claimed in claim 9, further comprising a transmitting module for transmitting the current running status of the user to the running shoe, so that the running shoe generates a haptic feedback, an auditory feedback or a visual feedback for prompting the user to adjust the running posture based on the current running status of the user.

11. The terminal as claimed in claim 9, wherein the obtaining module is configured to obtain real time front sole pressure values of the front sole of the user to the running shoe and real time heel pressure values of the heel of the user to the running shoe with a certain sampling cycle, and take a mean value from the front sole pressure values obtained successive N times as the first pressure value and a mean value from the heel pressure values obtained successive N times as the second pressure value, wherein N>1.

12. A running shoe for prompting a user to adjust a running posture, comprising:

a running shoe body;

a detection apparatus arranged in the running shoe body for obtaining running posture information of the user, wherein the detection apparatus comprises a pressure sensor arranged at a shoe-pad in the running shoe body corresponding to the front sole, the detection apparatus configured to:

obtain a first pressure value of a front sole of the user to the running shoe and a second pressure value of a heel of the user to the running shoe at a certain moment provided by the running shoe; and calculate a first difference between the first pressure value and a first pressure reference value of the front sole to the ground and a second difference between the second pressure value and a second pressure reference value of the heel to the ground, or calculate a first proportional relationship between the first pressure value and the second pressure value and a second proportional relationship between the first pressure reference value and the second pressure reference value, wherein the first pressure reference value is a pressure value of the front sole to the running shoe when the user's running posture is proper, the second pressure reference value is a pressure value of the heel to the running shoe when the user's running posture is proper; and determine a main force-application point of the current running posture of the user to be the front sole when the first difference is greater than or equal to 0 and the second difference is less than or equal to 0, or the first proportional relationship is greater than or equal to the second proportional relationship, and determining the main force-application point of the current running posture of the user to be the heel when the first difference is less than 0 and the second difference is greater than 0, or the first proportional relationship is less than the second proportional relationship;

a transmission apparatus for transmitting the running posture information to a terminal, so as to enable the terminal to determine a current running status of the user based on the running posture information and then generate a feedback for prompting the user to adjust an improper running posture; and a processing apparatus for determining a current running status of the user to be harmful to the user in response to the main force-application point of the current running posture of the user being determined to be the heel, and generate the feedback for prompting the user to adjust the improper running posture in response to the current running status being determined to be harmful to the user, and for obtaining a real time pressure value of the front sole to the running shoe in response to the main force-application point of the current running posture of the user being determined to be the front sole, and generating a feedback for prompting the user to adjust a running speed in response to the obtained real time pressure value is larger than a respective pressure reference value.

13. The running shoe as claimed in claim 12, wherein the detection apparatus is configured to obtain real time front sole pressure values of the front sole of the user to the running shoe and real time heel pressure values of the heel of the user to the running shoe with a certain sampling cycle, and take a mean value from the front sole pressure values obtained successive N times as the first pressure value and a mean value from the heel pressure values obtained successive N times as the second pressure value, wherein $N>1$.

* * * * *